Dec. 17, 1929.         F. J. CHAMPLIN         1,740,332
              AUTOMATIC REGULATING SYSTEM
                   Filed Aug. 20, 1928

Inventor:
Franklin J. Champlin,
by Charles E. Tullar
His Attorney.

Patented Dec. 17, 1929

1,740,332

UNITED STATES PATENT OFFICE

FRANKLIN J. CHAMPLIN, OF DALTON, MASSACHUSETTS, ASSIGNOR TO GENERAL ELECTRIC COMPANY, A CORPORATION OF NEW YORK

AUTOMATIC REGULATING SYSTEM

Application filed August 20, 1928. Serial No. 300,631.

My invention relates to automatic regulating systems and more particularly to those systems in which the voltage of an electrical distribution system is maintained constant at a predetermined point.

Figure 1:
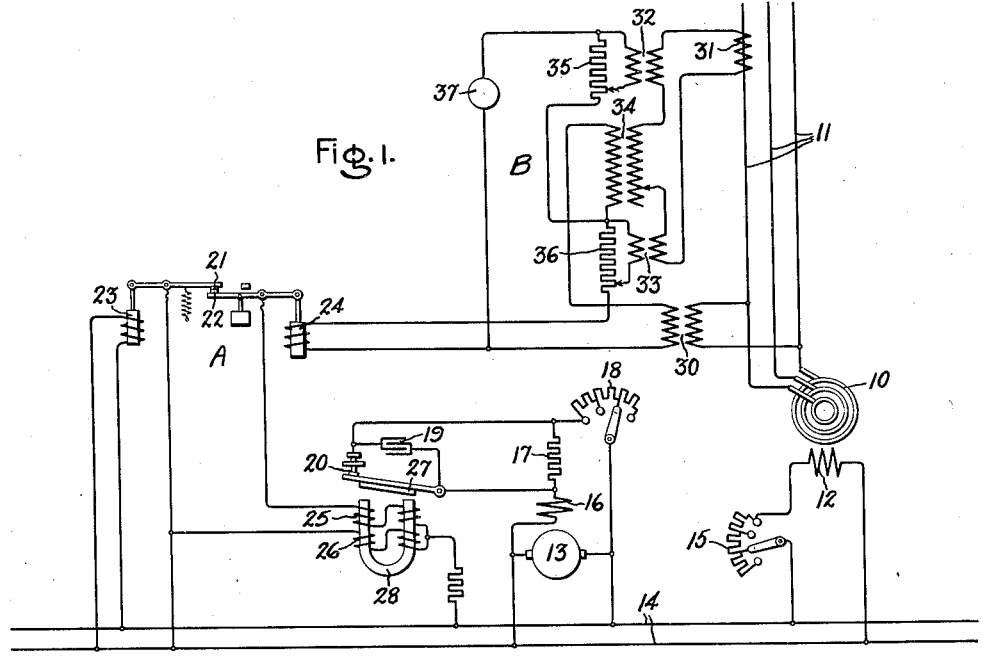
Figure 2:
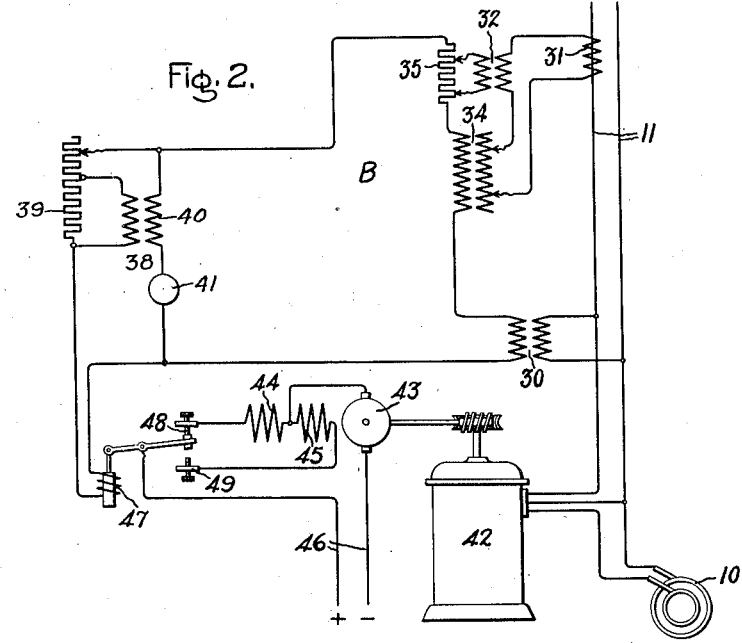

In systems of this character, it has been the practice to use a contact making instrument or voltmeter energized in response to current and voltage in the distributing system which it regulates, and to introduce in this coil circuit resistance and reactance adjustable to correspond with the constants of the system. This contact-making instrument might be one of the elements of a vibrating contact regulator of the Tirrill type as illustrated in Figure 1, or it might be used to control the reversible operating motor of an induction regulator as shown in Figure 2. With such an arrangement, it has been the practice to use the compensating resistance to serve the purpose of the contact-making voltmeter resistance also, to limit the current therein. The contact-making voltmeter requires an appreciable amount of current, so that there is a corresponding ohmic drop in the compensating resistance.

Obviously, the voltage at the receiving point of the system is that at the regulator end less that due to the impedance drop in the line. This voltage could be indicated by introducing into an indicating circuit measuring the potential at the regulator end of the system, an electromotive force proportional to the impedance drop in the line. This would be obtained by measuring the voltage across the contact-making voltmeter if it were not for the voltage drop in the compensating resistance due to the contact-making voltmeter current flowing therein.

It is an object of this invention to provide such a system in which it is possible to obtain a substantially accurate indication of the voltage existing at the predetermined point at which the constant voltage is being maintained.

It is a further object of this invention to provide means whereby both the regulator and the indicating circuit may be simultaneously adjusted to accurately maintain and indicate respectively, the voltage at any predetermined point.

A better understanding of my invention, its operation and advantages, will be obtained from the following description, taken in conjunction with the accompanying drawings, the two figures of which show diagrammatically two forms of the invention, and the features which I believe to be new and patentable will be pointed out in the appended claims.

Figure 1 illustrates the application of my invention to a regulator of the well-known Tirrill type in which the effective resistance in the field of the exciter of an alternating current generator is controlled by rapidly vibrating short-circuiting contacts. In this figure, the alternating current generator 10, supplies the distributing system 11. The alternator field 12 is energized by the exciter 13, through the direct current buses 14, in series with the adjustable resistance 15. The field 16 of the exciter 13 is shunt excited in series with the resistor 17 and the adjustable resistance 18. The resistor 17 is arranged to be short circuited in response to the operation of the regulator A, which is of the well known Tirrill vibrating contact type.

The regulator A consists of the two cooperating contacts 21 and 22 which are actuated respectively by a direct current magnet 23 connected across the exciter bus 14 and an alternating current magnet 24 energized from the line drop compensator B as explained below. The two contacts 21 and 22 are connected in the circuit of one of the windings 25 of a differential magnet 28, across the exciter bus, the other winding 26 of this differential magnet being connected directly across the exciter bus 14. The differential magnet 28 has a pivoted armature 27 which operates to close the contacts 20 when both the windings 25 and 26 are energized, thereby short circuiting the resistor 17 in the field circuit of the exciter 13. The contacts 20 are shunted by the condenser 19 to minimize sparking at the contact points.

The operation of the regulator A is well known in the art. The rapid opening and closing of the contacts 21 controls the exciter voltage and, in turn, the voltage on the system. The contact 22 is actuated by the alternating current magnet 24 which is energized from the compensator as hereinafter described.

The compensator B comprises the potential transformer 30 connected across one phase of the distributing system and a current transformer 31 connected in one phase thereof. In the secondary circuit of the current transformer 31 are included the primaries of the insulation transformers 32 and 33 and the reactance transformer 34, the latter being adjustable so that more or less of the primary may be included in the circuit as desired, though obviously the adjustment might be made in the secondary. The secondaries of the insulation transformers 32 and 33 are shunted by the adjustable resistances 35 and 36 respectively.

The alternating current magnet 24 of the regulator A is connected in series with the secondary of the potential transformer 30, the secondary of the reactance transformer 34, and the resistance 36 shunting the secondary of the insulation transformer 33. The reactance transformer 34 and the resistance 36 are adjusted so as to be equivalent respectively to the reactance and resistance of the distribution system 11, to the point at which it is desired to maintain constant voltage. Thus, there is induced in the circuit of the alternating current magnet 24 three electromotive forces: one proportional to the voltage at the generator by the potential transformer 30; one proportional to the reactive drop in the line to the point at which a constant voltage is maintained, by the reactance transformer 34 and one proportional to the corresponding resistance drop by the insulation transformer 33. These latter two induced electromotive forces oppose that corresponding to the voltage at the generator, so that if the regulator A is adjusted to maintain normal voltage, the voltage of the generator will be higher by an amount equal to the sum of the reactive and resistance drops to the point at which the voltage is to be controlled. Stated conversely, for any given generator voltage, the corresponding voltage applied to the alternating current magnet 24 will be less than normal by an amount proportional to the reactive and resistance drop in the line. That is, the regulator in combination with the line drop compensator will operate to maintain constant normal voltage at the point for which the compensator is adjusted.

The regulator A and compensator B function as a single unit and in practice are usually so constructed. For this reason, and for convenience of reference in the claims appended hereto, the combination of the regulator A and compensator B will be hereinafter referred to as the regulator.

If an indicating voltmeter be connected across the terminals of the alternating current magnet 24, an accurate indication of the voltage at the receiving end will not be obtained, for although there are induced in this circuit electromotive forces which compensate for the resistance and reactive drop in the line, there is an additional resistance drop due to the current drawn by the alternating current magnet 24, flowing through the resistance 36. There is also a small additional resistance drop in the secondary of the reactance transformer 34, but this is relatively insignificant.

The main object of my invention is to provide means for accurately indicating the voltage existing at the receiving end of the distribution system. The voltage at any predetermined point in the distribution system may be substantially accurately indicated by means of a second insulation transformer 32 whose secondary is shunted by a variable resistance 35. The indicating circuit includes the secondary of the potential transformer 30, the secondary of the reactance transformer 34, the adjustable resistance 35 shunting the secondary of the insulation transformer 32 and the indicating or recording voltmeter 37. In this circuit also there are induced three electromotive forces equal in magnitude and direction to those induced in the circuit of the alternating current magnet 24, as explained above, the insulation transformer 32 merely replacing insulation transformer 33. Thus a voltage proportional to the voltage obtaining on the system at the regulator less that due to the reactive and resistance drops to the receiving end is applied to the instrument 37, which is, in fact, the voltage on the system at the point at which it is being regulated. The voltage indicated by the instrument 37 is in error by an amount equal to the voltage drop in the resistance 35 due to the indicating voltmeter current and the reactance drop in the secondary of the reactance transformer 34 due to the sum of the indicating voltmeter current and that drawn by the alternating current magnet 24, but these combined errors are relatively unimportant, and insignificant relative to those which would be introduced in the indicating circuit if 37 were connected directly across the terminals of the magnet 24. The resistances 35 and 36 should be adjusted for the same voltage drop. It is found desirable in practice to so mount the adjustable resistances 35 and 36 that they may be simultaneously adjusted by a single operating member, although this is not essential, and they may be mounted and operated independently.

As stated above, the voltage indicated by the instrument 37 is in error by an amount equal to the voltage drop in the resistance 35 which is due to the indicating voltmeter current, and the reactance drop in the secondary of the reactance transformer 34 due to the sum of the indicating voltmeter current and that drawn by the alternating current magnet 24. I have found that the error may be eliminated by means of a compensating transformer as illustrated in Fig. 2 and explained below. The primary of the compensating transformer 38 is connected across part of the contact making voltmeter resistance 39 and excited by the secondary of the potential transformer 30. The secondary of the compensating transformer 38 forms a part of the indicating circuit winding 41, so any error due to the current required to operate the compensator, which in turn causes a voltage drop across the compensator, can be compensated for by the induced voltage into the winding 40. The other parts of the compensator are identical to those shown and described in part B of Fig. 1 and are similarly numbered. The compensator B is connected to the operating coil of the contact making voltmeter 47. The associated contacts 48 and 49 of this voltmeter 47 energize the field windings 44 and 45 respectively of the reversible operating motor 43 in series with its armature from the direct current supply 46. This motor 43 is illustrated as having a geared connection to the induction regulator 42 which may be of any well known type. The field windings 44 and 45 are oppositely wound and when energized in series with the motor armatures effect opposite rotation thereof, which, in turn, changes the setting of the regulator 42 to raise or lower the voltage of the system as may be necessary to maintain constant voltage at the receiving end, as is well known in the art. The operation of the line drop compensator and the indicator is identical with that described above in connection with their application to a Tirrill type regulator.

While I have described my invention as embodying various devices diagrammatically indicated, and as applied to particular systems, I do not intend to be limited thereto, but aim, in the following claims, to cover all changes and modifications as will be obvious to those skilled in the art, and all applications to the regulation of electrical systems where such a regulator would be adaptable.

What I claim as new and desire to secure by Letters Patent of the United States is:

1. In combination with an electrical distributing system, a regulator therefor, a line drop compensator through which said regulator is energized, an indicating circuit associated with said line drop compensator and means for jointly adjusting the electrical constants of the regulator and indicating circuits.

2. In combination with an electrical distributing system, a regulator for automatically maintaining constant voltage at any predetermined point in said system, an indicating circuit, and means for jointly adjusting the electrical constants of the regulator and indicating circuits for each point at which constant voltage is maintained.

3. In combination with an electrical distributing system, a regulator for automatically maintaining a constant voltage at any predetermined point in the system, and means associated with said regulator for indicating the voltage at said point.

4. In combination with an electrical distributing system, a regulator for automatically maintaining constant voltage at a distant point in said system, a voltmeter associated with the regulator for indicating the voltage at said point and means associated with both the regulator and voltmeter to compensate for the ohmic and reactive drop between said regulator and distant point.

5. In combination with an electrical distributing system, a regulator therefor operated in response to variations of voltage and current in said system, an indicating circuit associated with said regulator including line drop compensating means to neutralize the effect on said circuit of current variations in the system.

6. In combination with an electrical distributing system, a regulator therefor inductively connected to said system, and operable in response to changes of voltage and current in said system, an indicating circuit associated with said regulator, and means for compensating for the electromotive force induced in the indicating circuit due to variations in the current in said system.

7. In combination with an electrical distributing system, a regulator and a voltmeter for respectively maintaining and indicating a predetermined voltage at a distant point in said system, potential and current transformers through which said regulator and voltmeter are jointly energized, common means for compensating said regulator and voltmeter for the inductive drop in the system between the distant point and regulator and separate means for compensating the regulator and voltmeter for the ohmic drop in the system between the distant point and regulating point.

8. In combination with an electrical distributing system, a regulator thereof operable in response to changes in both voltage and current to maintain a constant voltage at any predetermined point in said system, an indicating circuit associated with said regulator and inductively coupled to said system whereby an electromotive force is induced in said indicating circuit to compensate for the change in voltage due to variations in the current in said system.

9. In combination with an electrical distributing system, a regulator therefor operable in response to variations in both voltage and current of the system, an indicating circuit associated therewith and means for jointly adjusting the electrical constants of the reglulator and indicating circuits for maintaining a constant voltage at any predetermined point in said system and obtaining an indication of the same.

10. In combination with an electrical distribution system, a line drop compensator and indicating circuit comprising a potential transformer and a current transformer associated with said distribution system, an adjustable reactance transformer and an insulation transformer energized from the secondary of said current transformer, adjustable resistance shunting the secondary of the insulation transformer, a regulating circuit including the secondary of the potential transformer, the secondary of the reactance transformer and the adjustable resistance of the insulation transformer and an indicating circuit including the secondary of the potential transformer, the secondary of the insulation transformer and means for inducing into said indicating circuit a voltage to compensate for the current in the regulating circuit.

In witness whereof, I have hereunto set my hand this sixteenth day of August, 1928.

FRANKLIN J. CHAMPLIN.